(12) United States Patent
Inui et al.

(10) Patent No.: US 8,773,671 B2
(45) Date of Patent: Jul. 8, 2014

(54) IMAGE PROCESSING APPARATUS THAT PERFORMS AUTOMATIC CONTROL METHOD SETTING

(75) Inventors: Kazuo Inui, Itami (JP); Tomo Tsuboi, Itami (JP); Hisashi Uchida, Kuze-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1532 days.

(21) Appl. No.: 11/842,261

(22) Filed: Aug. 21, 2007

(65) Prior Publication Data

US 2008/0055624 A1 Mar. 6, 2008

(30) Foreign Application Priority Data

Sep. 5, 2006 (JP) ................................. 2006-240372

(51) Int. Cl.
*G06F 3/12* (2006.01)

(52) U.S. Cl.
USPC ......... 358/1.13; 358/1.9; 358/1.12; 358/1.14; 715/747; 715/236; 709/206; 709/223

(58) Field of Classification Search
None
See application file for complete search history.

(56) References Cited

U.S. PATENT DOCUMENTS

| | | | |
|---|---|---|---|
| 5,594,858 A * | 1/1997 | Blevins | 715/747 |
| 5,768,483 A * | 6/1998 | Maniwa et al. | 358/1.15 |
| 5,774,118 A * | 6/1998 | Hatakama | 715/707 |
| 6,345,278 B1 * | 2/2002 | Hitchcock et al. | 1/1 |
| 6,498,654 B1 * | 12/2002 | Cusack, Jr. | 356/614 |
| 6,498,659 B1 * | 12/2002 | Konishi | 358/1.18 |
| 7,110,791 B2 * | 9/2006 | Izumi | 455/557 |
| 7,742,106 B2 * | 6/2010 | Ko et al. | 348/569 |

FOREIGN PATENT DOCUMENTS

| | | |
|---|---|---|
| JP | 8-166945 A | 6/1996 |
| JP | 8-212258 A | 8/1996 |
| JP | 10-021037 A | 1/1998 |
| JP | 2003-308148 | 10/2003 |
| JP | 2006-227702 | 8/2006 |

OTHER PUBLICATIONS

Notification of Reason for Refusal in JP 2006-240372 dated Jul. 22, 2008, and English Translation thereof.

* cited by examiner

*Primary Examiner* — Ashish K Thomas
(74) *Attorney, Agent, or Firm* — Buchanan Ingersoll & Rooney PC

(57) ABSTRACT

An image processing apparatus that can be controlled according to multiple control methods for multiple types of control. The image processing apparatus includes a user identifier obtaining unit that obtains a user identifier; a specification input receiving unit that receives the input of one type of control specified from among multiple types of control as well as one of multiple control methods that are supplied for each type of control; a control method setting unit that, based on the specification input received by the specification input receiving unit, performs default configuration that sets one of the multiple control methods that are supplied for each of the other multiple types of control; a control method storage unit that stores the control method for the specified type of control as well as control methods for the other types of control set by the control method setting unit while associating them with the user that is specified by the user identifier obtained by the user identifier obtaining unit; and a controller that executes control with regard to the multiple types of control in accordance with the control methods stored in the control method storage unit.

21 Claims, 15 Drawing Sheets

FIG.5

| | | HELP DISPLAY | ERROR RECOVERY DISPLAY | WORKFLOW REGISTRATION | SELECTION MENU DISPLAY | OPERATION STATUS DISPLAY | SECURITY LEVEL |
|---|---|---|---|---|---|---|---|
| HIGH | 5 | DISPLAY SEARCH HELP | DISPLAY ALL AVAILABLE RECOVERIES | | TREE FORMAT | DISPLAY NO BACKGROUND OPERATION | TRANSMISSION OF CONFIDENTIAL DOCUMENTS PERMITTED |
| | 4 | DISPLAY HELP FOR INFREQUENTLY USED FUNCTIONS AS WELL | NORMAL RECOVERY | NO DEFAULT SETTING (FREE EDITING VIA EDITOR) | MENU FORMAT (MORE ITEMS THAN REGULAR DISPLAY) | DISPLAY BACKGROUND OPERATION ONLY AFTER ERROR | REGULAR TRANSMISSION PERMITTED (NO TRANSMISSION OF DATA WITH CONFIDENTIALITY ATTRIBUTE) |
| | 3 | NORMAL HELP | DISPLAY RECOMMENDED RECOVERY METHODS ONLY WHILE OTHER METHODS ARE ALSO AVAILABLE | REGISTER BY SPECIFYING BASIC OPERATION | REGULAR DISPLAY | DISPLAY BACKGROUND OPERATION AS ICON | TRANSMISSION TO REGISTERED RECIPIENTS ONLY PERMITTED |
| | 2 | DISPLAY HELP ONLY FOR FREQUENTLY USED FUNCTIONS | IF MULTIPLE RECOVERY METHODS ARE AVAILABLE, DISPLAY THEM TO ENABLE SELECTION | FUNCTION-COMBINED WORKFLOW REGISTRATION | SELECTION OF BASIC FUNCTIONS ONLY (ENLARGED DISPLAY) | BACKGROUND OPERATION ENABLED IF PERMITTED BY USER | TRANSMISSION WITHIN INTRANET ONLY PERMITTED |
| LOW | 1 | DISPLAY HELP FOR FUNCTION CURRENTLY DISPLAYED | DISPLAY SINGLE METHOD ONLY | GOAL-ORIENTED WORKFLOW REGISTRATION | DISPLAY STANDALONE BASIC FUNCTIONS ENLARGED | NO BACKGROUND OPERATION | NETWORK CONNECTION NOT PERMITTED |

FIG.8

| | HELP DISPLAY | ERROR RECOVERY DISPLAY | WORKFLOW REGISTRATION | SELECTION MENU DISPLAY | OPERATION STATUS DISPLAY | SECURITY LEVEL |
|---|---|---|---|---|---|---|
| HELP DISPLAY 1 | — | 1 | 1 | 1 | 1 | 1 |
| HELP DISPLAY 2 | — | 2 | 1 | 2 | 1 | 1 |
| HELP DISPLAY 3 | — | 2 | 1 | 3 | 2 | 2 |
| HELP DISPLAY 4 | — | 3 | 2 | 3 | 3 | 3 |
| HELP DISPLAY 5 | — | 5 | 3 | 3 | 3 | 4 |
| ERROR RECOVERY DISPLAY 1 | 1 | — | 1 | 1 | 1 | 1 |
| ERROR RECOVERY DISPLAY 2 | 2 | — | 1 | 2 | 2 | 2 |
| ERROR RECOVERY DISPLAY 3 | 3 | — | 2 | 3 | 3 | 3 |
| ... | ... | ... | ... | ... | ... | ... |

FIG.10

| USER IDENTIFIER | HELP DISPLAY | ERROR RECOVERY DISPLAY | WORKFLOW REGISTRATION | SELECTION MENU DISPLAY | OPERATION STATUS DISPLAY | SECURITY LEVEL |
|---|---|---|---|---|---|---|
| JOHN | 3 | 2 | 1 | 3 | 2 | 2 |
| PAUL | 2 | 2 | 1 | 2 | 2 | 2 |
| . . . | . . . | . . . | . . . | . . . | . . . | . . . |

FIG.16

| | HELP DISPLAY | ERROR RECOVERY DISPLAY | WORKFLOW REGISTRATION | SELECTION MENU DISPLAY | OPERATION STATUS DISPLAY | SECURITY LEVEL |
|---|---|---|---|---|---|---|
| HELP DISPLAY | — | | | | | |
| ERROR RECOVERY DISPLAY | 3 | — | | | | |
| WORKFLOW REGISTRATION | 1 | 1 | — | | | |
| SELECTION MENU DISPLAY | 3 | 3 | 2 | — | | |
| OPERATION STATUS DISPLAY | 2 | 2 | 2 | 2 | — | |
| SECURITY LEVEL | 1 | 1 | 2 | 1 | 3 | — |

3=CLOSELY RELATED   2=MILDLY RELATED   1=UNRELATED

FIG.18

| USER IDENTIFIER | TYPE OF CONTROL | CONTROL LEVEL | DEFAULT SETTING | DATE OF INPUT |
|---|---|---|---|---|
| JOHN | HELP DISPLAY | 3 | YES | 2006/07/10 15:10:26 |
| JOHN | ERROR RECOVERY DISPLAY | 3 | NO | 2006/07/14 11:25:42 |
| JOHN | HELP DISPLAY | 5 | NO | 2006/07/19 16:46:12 |
| JOHN | OPERATION STATUS DISPLAY | 4 | NO | 2006/07/24 13:05:08 |
| ... | ... | ... | ... | ... |

IMAGE PROCESSING APPARATUS THAT PERFORMS AUTOMATIC CONTROL METHOD SETTING

This application is based on Japanese Patent Application No. 2006-240372 filed in Japan on Sep. 5, 2006, the entire content of which is hereby incorporated by reference.

BACKGROUND OF THE INVENTION

1. Field of the Invention

The present invention relates to an image processing apparatus.

2. Description of Related Art

Image processing apparatuses such as copying machines have an increasing number of functions in recent years, and the multi-function peripheral (MFP) that incorporates a scanning function, fax function and document server function in addition to a copying function is becoming a mainstream apparatus.

As the number of functions increases, the operation of image processing apparatuses is becoming more and more complex, requiring the user to carry out the setting of various different parameters.

However, it is quite troublesome for the user to set each of the various parameters. Furthermore, it is difficult for a regular user to perform appropriate setting of all parameters.

In order to resolve these problems, a technology is disclosed in Japanese Laid-Open Patent No. H8-166945, for example, in which the user's skill level is assessed via analysis of the user's operation log and help information or the like corresponding to the user's skill is displayed based on the results of this assessment.

However, according to the technology of Japanese Laid-Open Patent No. H8-166945, the problem exists that the intentions of the user are not reflected in the content of the help information or the like and therefore display changes not intended by the user occur, making the user feel ill at ease.

OBJECT AND SUMMARY

An object of the present invention is to provide an improved image processing apparatus that resolves the various problems described above.

Another object of the present invention is to provide an image processing apparatus that enables more user-friendly setting of control methods.

Yet another object of the present invention is to provide an image processing apparatus that can reduce the complexity of control method configuration while still reflecting the user's intentions.

These objects are attained by providing an image processing apparatus that can be controlled according to multiple control methods for multiple types of control, including:

a user identifier obtaining unit that obtains a user identifier;

a specification input receiving unit that receives the input of one type of control specified from among multiple types of control as well as one of multiple control methods that are supplied for each type of control;

a control method setting unit that, based on the specification input received by the specification input receiving unit, performs default configuration that sets one of the multiple control methods that are supplied for each of the other multiple types of control;

a control method settings storage unit that stores the control method for the specified type of control as well as control methods for the other types of control set by the control method setting unit while associating them with the user that is specified by the user identifier obtained by the user identifier obtaining unit; and a controller that executes control with regard to the multiple types of control in accordance with the control methods stored in the control method settings storage unit.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 is a drawing to explain the types of control and control methods in the present embodiment;

FIG. 8 is a drawing showing one example of the content of the default settings table;

FIG. 10 is a drawing showing one example of the content of the control method settings storage unit 233;

FIG. 16 is a drawing showing one example of the content of the table storing the relationships between the types of control;

FIG. 18 is a drawing to explain one example of the content of the setting history storage unit 231.

DETAILED DESCRIPTION OF THE PREFERRED EMBODIMENTS

Embodiments of the present invention are described below with reference to the drawings using an MFP (multifunction peripheral) as an example of the image processing apparatus pertaining to the present invention.

Embodiment 1

(1) Construction of Image Processing System

Figure 1:
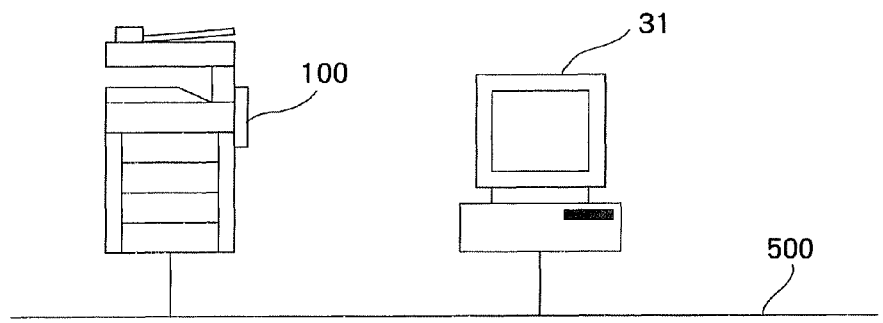
FIG. 1 is a drawing showing one example of the overall construction of an image processing system.

FIG. 1 is a drawing showing one example of the overall construction of an image processing system including an image processing apparatus of the embodiment. The image processing system comprises an MFP 100 comprising this embodiment and a PC (personal computer) 31 that are connected to each other via a network 500 such as a LAN or the like.

As explained in detail below, in the MFP 100 comprising this embodiment, multiple-level control approaches are supplied for multiple types of control, such as help display and recovery method display that is displayed when an error occurs. The user can select and specify a control method for each type of control using the MFP 100, but in this embodiment, control method selection and specification can be carried out via the PC 31 as well. In addition, image data can be sent from the PC 31 to the MFP for print processing as well.

(2) Construction of MFP 100

Figure 2:
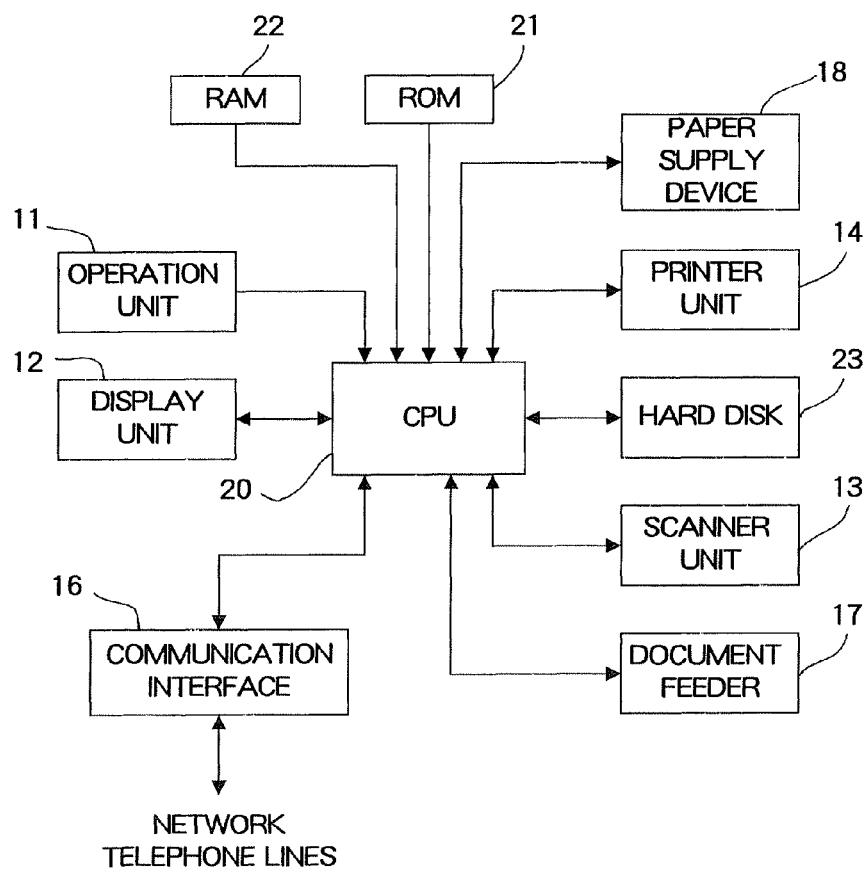
FIG. 2 is a drawing showing one example of the hardware construction of an MFP 100.
Figure 3:
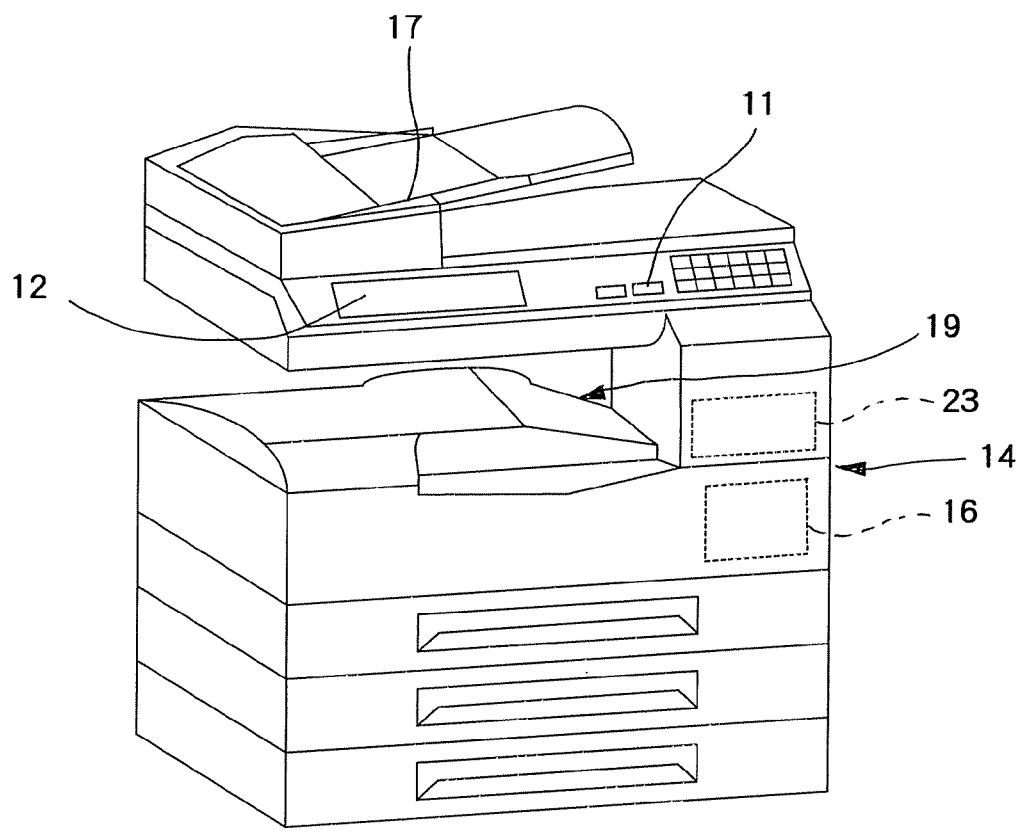
FIG. 3 is a drawing showing one example of an external view of the MFP 100.

FIG. 2 is a drawing showing one example of the hardware construction of the MFP 100. FIG. 3 is a drawing showing one example of the external view of the MFP 100. As shown in FIG. 2, the MFP 100 comprises an operation unit 11, a display unit 12, a scanner unit 13, a printer unit 14, a communication interface 16, a document feeder 17, a paper supply device 18, a CPU 20, a ROM 21, a RAM 22, a hard disk 23 and other components.

The operation unit 11 comprises multiple keys by which to input numbers, letters and symbols, sensors that recognize the keys that have been pressed, a transmission circuit that sends a signal indicating the recognized key to the CPU 20, and other components.

The display unit 12 displays screens that display messages to the user, screens used by the user to input a control method specification or change and to input his user identifier, screens by which to operate the MFP 100 (including the help screen and workflow registration screen, for example), screens that show the results of executed processing, and the like.

In this embodiment, a touch panel, which is a component of the operation unit 11, is used on the display unit 12. The touch panel includes a function to detect the location thereon that has been touched by the user's finger and to send a signal indicating the detection result to the CPU 20.

The scanner unit 13 reads the image on the original document and generates digital image data (density data indicating the RGB or black density in this embodiment) by emitting light toward the original document and detecting the light reflected off the original document. The image data obtained this way is used by the printer unit 14 for printing or converted into a TIFF, PDF or JPEG format file and stored on the hard disk 23. It may be converted into fax data, which is supplied for fax transmission. The document feeder 17 is disposed on the main unit of the MFP 100 (see FIG. 3) and is used to send the original document comprising one sheet or multiple sheets one by one to the scanner unit 13.

The printer unit 14 prints on recording sheets comprising paper or film images read by the scanner unit 13, images representing the data sent from an external device such as the PC 31 that is connected via a network such as the LAN 500, or images representing fax data received via fax transmission. The paper supply device 18 is disposed in the lower part of the main unit of the MFP 100 and is used to supply recording sheets appropriate for the image to be printed to the printer unit 14. The recording sheets on which an image has been printed by the printer unit 14 are ejected onto a tray 19 (see FIG. 3).

The communication interface 16 is a device to communicate with external devices such as PCs over a network or to send or receive fax transmissions via a telephone line. For the interface 16, a NIC (network interface card), modem or TA (terminal adapter) is used.

Various control programs and data necessary to realize the basic functions of the MFP 100, such as functions to read (scan) images, duplicate (copy) original documents, send and receive fax data, perform network printing and perform document server functions (box functions) are stored on the ROM 21. The control programs include a program for display control regarding the display unit 12. In addition, programs and data necessary to realize the control method setting of this embodiment as well as control based on the set methods are stored as well.

Part or all of these programs and data may be installed on the hard disk 23. In this case, the programs and data installed on the hard disk 23 are loaded to the RAM 22 where necessary. The functions explained in connection with this embodiment may be executed not only by the CPU 20 but also using a dedicated hardware device such as a DSP (digital signal processor) or an ASIC (application-specific integrated circuit). They also may be executed using the functions of a general-purpose program such as the operating system (OS).

Figure 4:
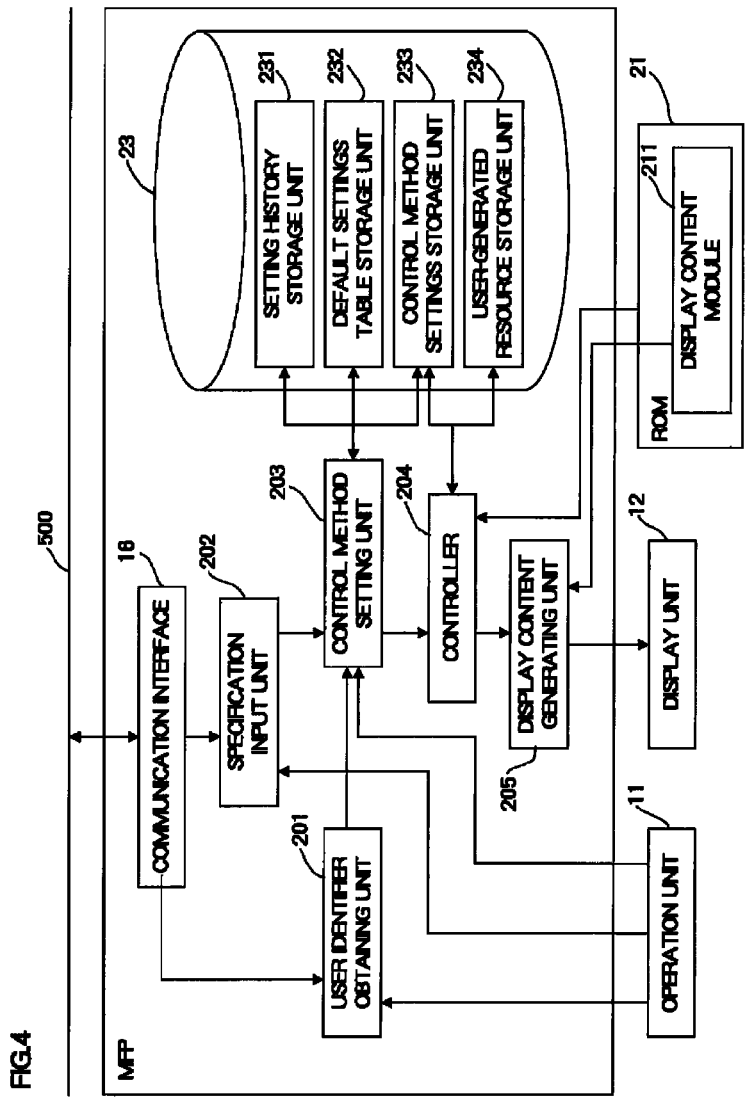
FIG. 4 is a block diagram showing the functional construction of the MFP 100.

FIG. 4 is a block diagram showing the functional construction of the MFP 100. As shown in the drawing, the MFP 100 includes a user identifier obtaining unit 201, a specification input unit 202, a control method setting unit 203, a controller 204, and a display content generating unit 205. The operations of these units are realized via execution of the programs stored on the ROM 21 by the CPU 20.

The ROM 21 stores a display content module 211, which is a module (programs and data) used for display control regarding the display unit 12. The hard disk 23 includes a setting history storage unit 231, a default settings table storage unit 232, a control method settings storage unit 233, and a user-generated resource storage unit 234.

The user identifier obtaining unit 201 obtains user identifiers input via the operation unit 11. User identifiers may be input from external devices via the communication interface 16. The specification input unit 202 receives user input specifying a control method with regard to one of the multiple supplied types of control.

The multiple supplied types of control and control methods will now be explained. FIG. 5 is a drawing to explain the types of control and control methods of this embodiment. The supplied types of control are 'help display', 'error recovery display', 'workflow registration', 'selection menu display', 'operation status display', and 'security level'. Multiple control methods are provided for each type of control.

In this embodiment, control methods are supplied in accordance to five levels from level 1 to level 5. This embodiment assumes different user skill levels with regard to the operation of the MFP 100. For example, an appropriate control approach is provided for low skill level users as level 1 control while an appropriate control approach is provided for high skill level users as level 5 control. Naturally, such levels need not be limited to assumptions based on differences in skill level.

The multiple types of control may all be set to level 1, for example, by default. The controller 204 executes control regarding the various types of control according to the specified control levels. The control regulates display content control for the display unit 12, control as to whether or not data access is enabled, and control as to whether a function is available, for example.

The details of the supplied control methods will be described below, but for now, the explanation based on FIG. 4 will be used. The control method setting unit 203 performs control method setting for each user based on input received via the specification input unit 202.

Figure 6:
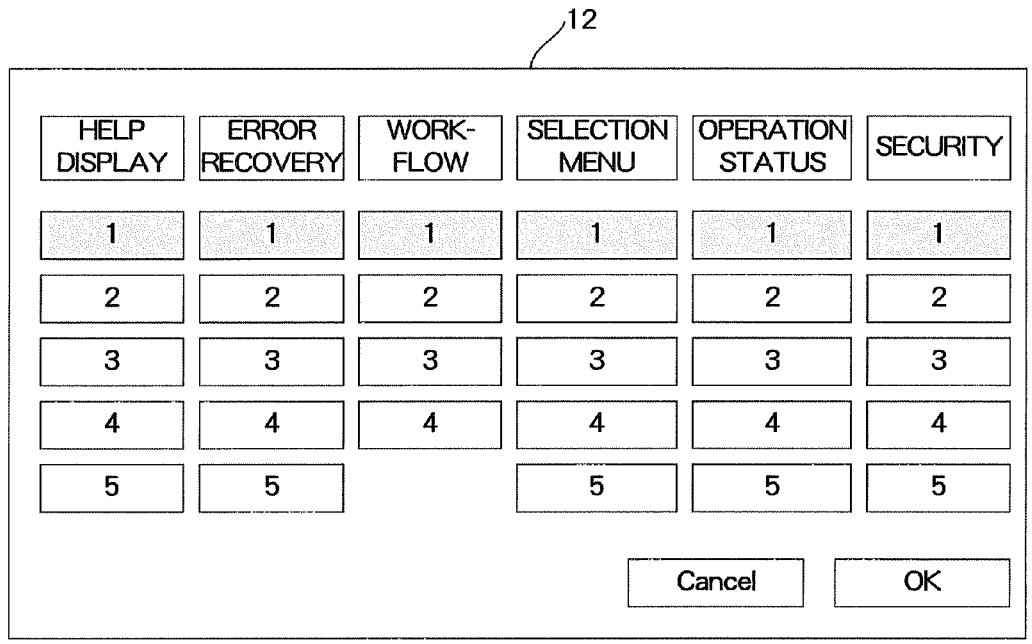
FIG. 6 is a drawing showing one example of the control method setting screen.

FIG. 6 is a drawing showing one example of the control method setting screen. As shown in the drawing, level 1 is set for all types of control by default. The user can select and specify one control level for any type of control. For example, the user can specify and set level 3 for help display control.

Figure 7:
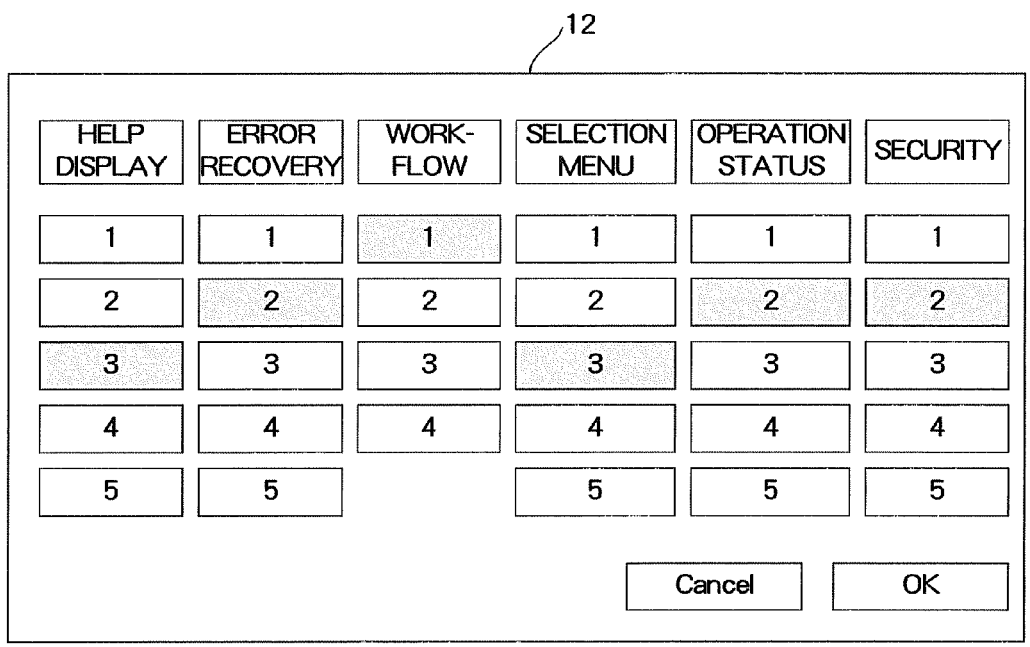
FIG. 7 is a drawing showing one example of settings for the other types of control when level 3 is specified for help display control.

Based on such specification, the control method setting unit 203 sets control levels for the types of control other than the type for which a control level has been specified. FIG. 7 is a drawing showing one example of the settings for the other types of control when level 3 is specified for help display control. This setting is performed based on the default settings table stored in the default settings table storage unit 232. FIG. 8 is a drawing showing one example of the content of the default settings table.

The leftmost fields of the drawing show the specified type of control and the second fields from the left show the specified control method (level). In other words, the first row shows that when the user specifies level 1 to be set for help display control via the specification screen shown in FIG. 6, the other types of control are all set to level 1 as well by default. The data in this row is meaningful when all types of control are set not to level 1 but to level 3, for example, by default.

Figure 9:
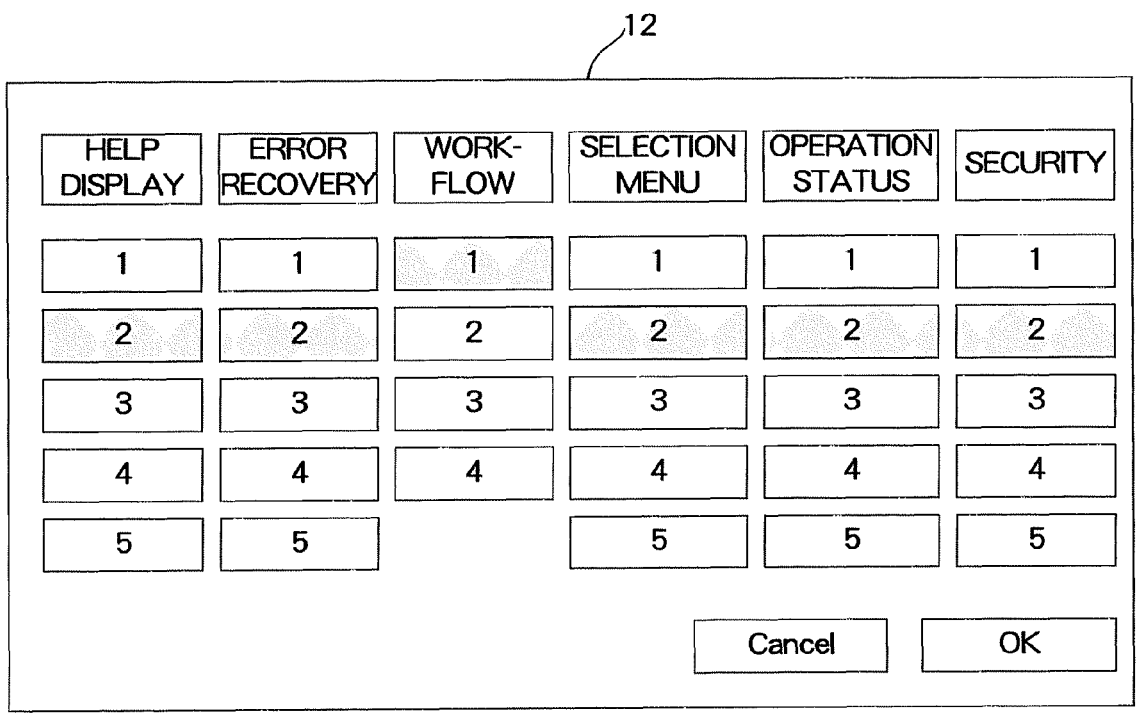
FIG. 9 is a drawing showing one example of settings for the other types of control when level 2 is specified for error recovery display control.

The third row of FIG. 8 (where level 3 is specified for help display control) corresponds to FIG. 7. The content of the default settings table can be appropriately modified depending on the MFP 100's configuration environment because, for example, the preferred level for the other types of control varies depending on various conditions when level 3 is specified for help display control.

Where level 3 is specified for help display control as described above, the setting for error recovery display control becomes level 2. However, where level 2 is specified for error recovery display, the control level for help display control does not necessarily become level 3. As shown in the seventh row of FIG. 8, in this embodiment, the setting for help display control in this case becomes level 2. FIG. 9 shows the settings in this case, which are different from those shown in FIG. 7.

As described above, in this embodiment, even though when one control level (level 3, for example) is specified for one type of control (help display control, for example), a control level (level 2, for example) is specified for another type of control (error recovery display control, for example), if the same control level (level 2, for example) is specified for the other type of control (error recovery display control, for example), a control level (level 2, for example) that is different from the control level (level 3, for example) specified for that type of control (help display control, for example) is set for such type of control. This is done because even though when the user specifies the first control level (level 3, for example) for the first type of control (help display control, for example), the second control level (level 2, for example) is determined to be appropriate (i.e., automatically set) for the second type of control (error recovery control, for example), when the user specifies the second control level (level 2, for example) for the second type of control (error recovery display control, for example), the control level determined to be appropriate (level 2, for example) for the first type of control (help display control, for example) is not necessarily the first control level (level 3, for example). In other words, the type of control specified by the user is also used as a factor in determining the user level estimation in connection with the other types of control. Through such determination, more appropriate control levels can be set.

These settings made in this way are stored in the control method settings storage unit 233 in association with users that are identified by user identifiers. FIG. 10 is a drawing showing one example of the content of the control method settings storage unit 233. The controller 204 executes actual control with reference to these settings.

Figure 11:
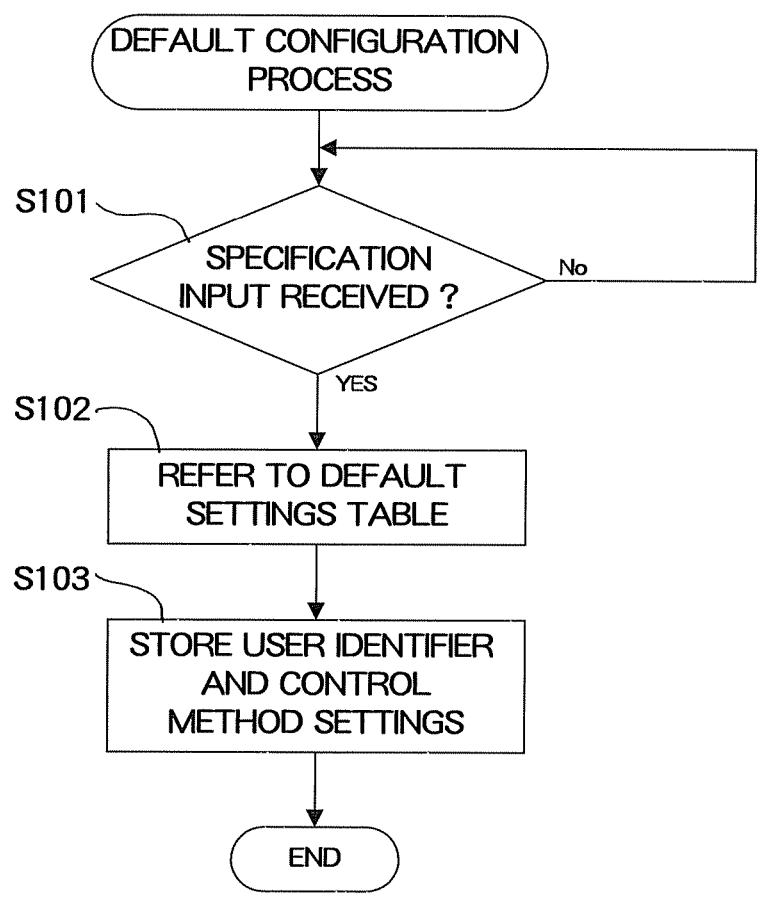
FIG. 11 is a flow chart to explain the processing performed by the CPU 20 during the default configuration process.

FIG. 11 is a flow chart to explain the sequence of operations performed by the CPU 20 during the default configuration process described above. When a specification is input (Yes in S101), the CPU 20 refers to the default settings table shown in FIG. 8 (S102) and stores the user identifier and the specified control method in the control method settings storage unit 233 (S103). The processing explained with reference to the flow chart is realized via execution of the programs stored on the ROM 21 by the CPU 20 for example.

Returning to FIG. 4, the display content generating unit 205 generates the display content for the display unit 12 in accordance with the control executed by the controller 204. User resources, such as the workflows described below, are stored in the user-generated resource storage unit 234. The setting history storage unit 231 will be described below.

(3) Specific Content of Control Methods

Figure 12:
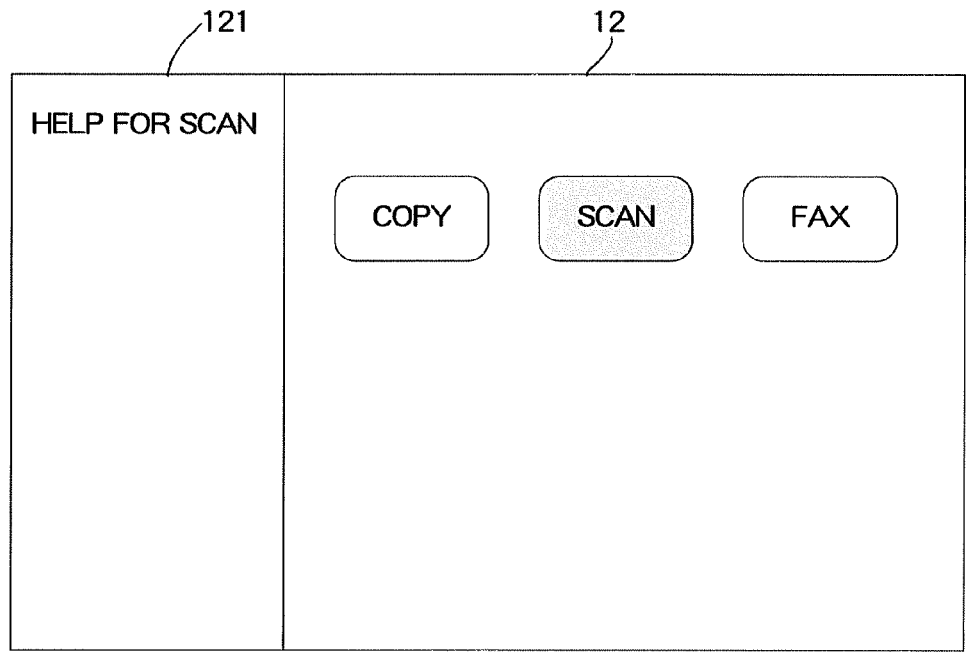
FIG. 12 is a drawing showing in a summary fashion one example of the display on the display unit 12 when help display control is set to level 1.

The specific content regarding the control methods set forth for each type of control shown in FIG. 5 will now be explained below.

Where level 1 ('display help for function currently displayed') is set for help display control, as shown in a summary fashion in FIG. 12, control is carried out such that a help display area 121 is maintained at all times in a part of the display unit 12 and help regarding the selected function (the scan function in the example shown in the drawing) is displayed.

Where level 2 ('display help only for frequently used functions') is set, in the example of FIG. 12, control is carried out such that help is displayed in the help display area 121 when a frequently used function such as 'copy' is selected, and no help is displayed in the help display area 121 when a function that is not frequently used is selected.

Where level 3 ('normal help') is set, a help button is displayed on the display unit 12, for example, and control is carried out such that normal help is displayed when the help button is pressed. Where level 4 ('display help for infrequently used functions as well') is set, control is carried out such that help for functions that are infrequently used is also displayed when the help button is pressed. Where level 5 ('display search help') is set, control is carried out such that a list of help options is displayed and the user is prompted to select an option for which help display is desired when the help button is pressed.

Control methods reflecting multiple different levels are supplied as described above, and once one of the control methods is set, control for each of the various types of control is executed based on such setting.

Error recovery display control will be explained based on an example in which the size of the original document placed on the platen of the scanner unit 13 is A4, but the MFP has run out of A4 recording paper, for example. Where level 1 ('display single method only') is set for error recovery display control, control is carried out to display a message indicating the simplest way to eliminate the error, such as 'Paper out. Please add paper,' for example.

Where level 2 ('if multiple recovery methods are available, display them to enable selection') is set, recommended recovery methods are displayed and the user is prompted to specify one of them. For example, control is carried out such that multiple recovery methods, such as 'add paper' and 'print on larger-size (B4, for example) recording paper' are displayed. The user can execute print processing by selecting 'print on B4-size recording paper'.

'Recommended recovery methods' are supplied, and in the case where paper has run out, while such recovery methods as 'print on smaller-size recording paper' and 'enlarge/reduce image' are available, in this embodiment, when level 2 is set, these methods are deemed as 'not recommended recovery methods' and control is carried out such that execution of these methods is not allowed.

Where level 3 ('display recommended recovery methods only while other methods are also available') is set, while the content of display is the same as for level 2, control is carried out such that recovery methods that are not recommended can also be executed.

At level 5, control is carried out such that all available recovery methods are displayed. Level 4 ('normal recovery') control is a control between level 3 and level 5. Control may be carried out such as recovery methods that can only be executed by the administrator are not displayed.

Before workflow registration control is explained, 'workflow' will first be explained. A workflow is a function that enables a series of processes and parameters to be registered in advance and represents a resource such as a program that includes the conditions governing the start of processing, the content of processing, and parameter information. The levels are different from one another in that the content of display on the display unit 12 varies depending on the differences in the tasks that need to be performed to register a new workflow.

Figure 13:
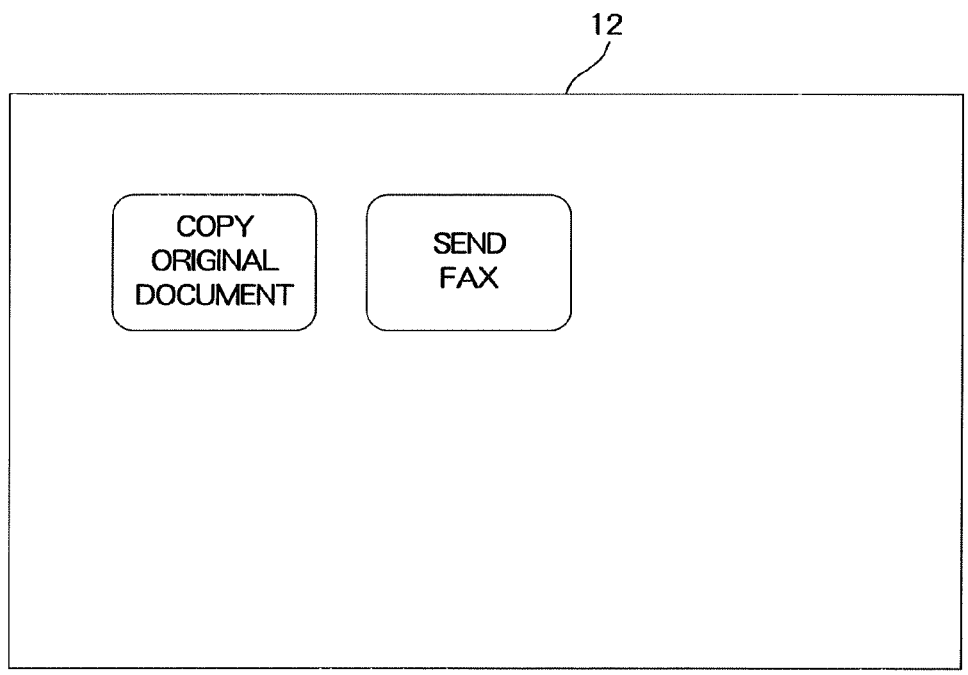
FIG. 13 is a drawing showing in a summary fashion one example of the display on the display unit 12 when workflow registration control is set to level 1.

For example, at level 1 ('goal-oriented workflow registration'), as shown in FIG. 13, the purpose of the processing (e.g., 'copy original' or 'send fax', for example) executed via the workflow is displayed on each maximum-size button. A user who wants to register a new workflow selects either button, and using the screen subsequently displayed, inputs data such as the conditions governing the start of processing, i.e., the processing start time, the number of copies to be made, the paper size or the fax recipient number. This input registers the workflow in the user-generated resource storage unit 234. At the specified time, the workflow is executed and fax is sent to the specified fax number, for example.

The user resources such as the workflows generated via user operation in this way are stored in the user-generated resource storage unit 234, and these user resources are not deleted when the control level is changed and can be continue to be used unchanged.

At level 2 ('function-combined workflow registration') of workflow registration control, more detailed functions than level 1 are displayed on buttons smaller than in the example of FIG. 13, and the user can register workflows by combining these displayed functions. At level 3 ('register by specifying basic operation'), functions more detailed than those available at level 2 are displayed such that registration processing where various data is specified for the selected function can be performed. During workflow registration up to level 3, combinations of ready-made workflow models and the setting of parameters based on user operation are carried out, and the differences between the levels may be deemed the differences in the models used. At level 4, no models are used and the user generates workflows in the same manner as program editing.

Figure 14:
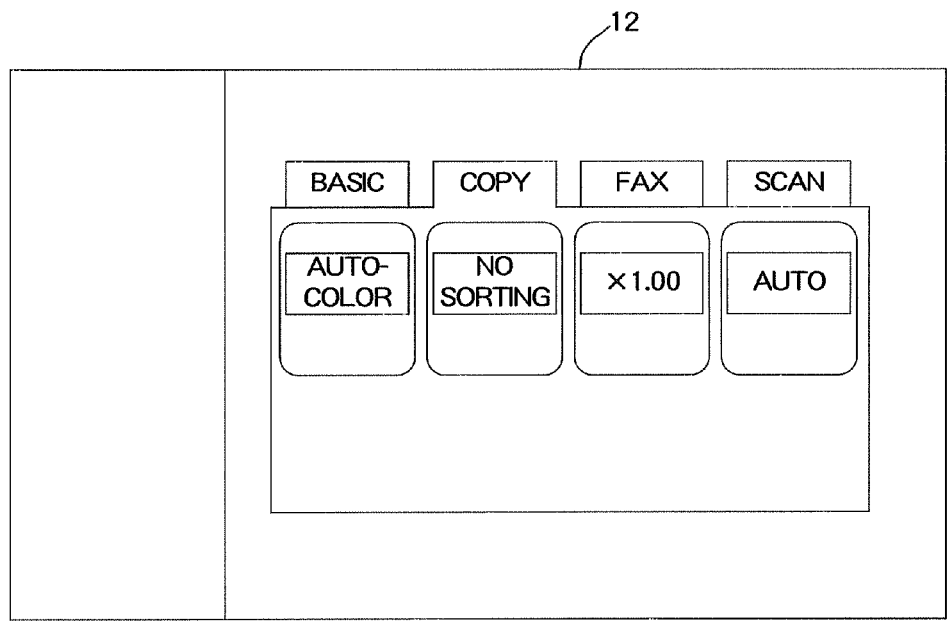
FIG. 14 is a drawing showing in a summary fashion one example of the display on the display unit 12 when selection menu display control is set to level 3.
Figure 15:
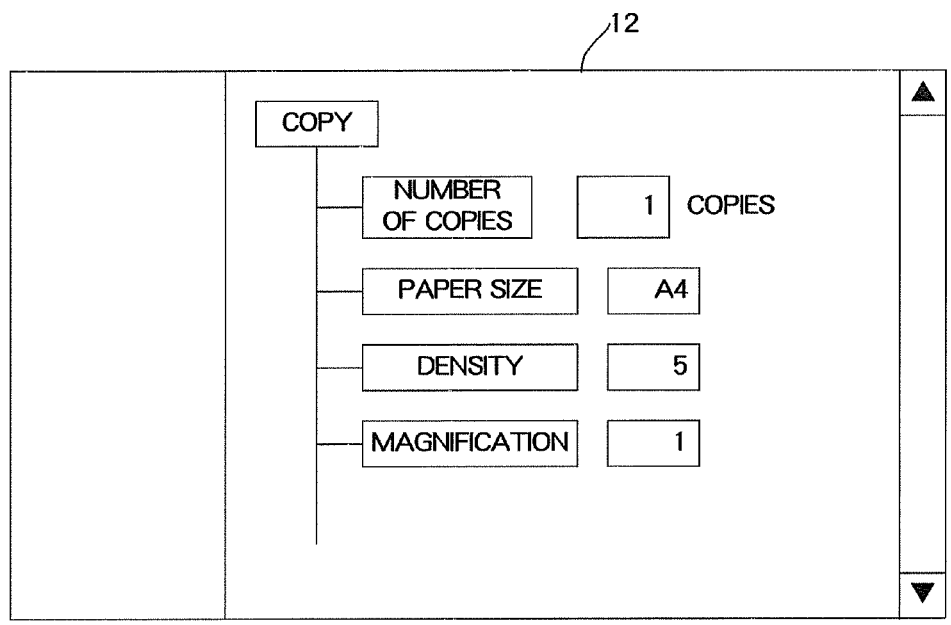
FIG. 15 is a drawing showing in a summary fashion one example of the display on the display unit 12 when selection menu display control is set to level 5.

'Selection menu' in selection menu display control refers to the menu screen in which a function such as copy, fax or scan is selected as shown in FIG. 12. Where level 1 ('display standalone basic functions enlarged') is set for selection menu display control, as shown in FIG. 12 for example, large-size buttons are displayed in connection with basic functions such as copy. Because only standalone basic functions are displayed, functions such as that in which image data obtained by reading an original document using the scanner unit 13 is sent to an external device via the LAN 500, for example, are not displayed.

Where level 2 ('selection of basic functions only (enlarged display)') is set, functions such as the external data transmission described above are also displayed on the menu screen, but selection buttons are displayed only for basic functions. The size of the buttons is large.

Where level 3 ('regular display') is set, as shown in summary fashion in FIG. 14, a screen in which function selection tabs are displayed and somewhat complex setting is enabled is displayed. At level 4 ('menu format (more items than regular display)'), a screen that is similar to that shown in FIG. 14 but has more selectable items than those shown at level 3, including functions executable only by the administrator, for example, is displayed.

Where level 5 ('tree format') is set, as shown in a summary fashion in FIG. 15, control is carried out such that a tree-format selection menu is displayed. In the selection menu, the amount of information displayed on the screen increases in principle as the level increases from 1 to 5.

'Operation status' in operation status display control refers to the print job operation status present when a print job is input from an external device such as the PC 31 while a user is copying a document, for example. In this control, execution of print jobs is enabled or disabled and display on the display unit 12 of the fact that a print job has been input is adjusted. The operation regarding print jobs in such a situation is called 'background operation'.

At level 1 ('no background operation'), no background operation is permitted. At level 2 ('background operation enabled if permitted by user'), the fact that a print job has been input is displayed to the user who is copying a document, and execution of the print job is permitted in the background if the user gives permission.

At level 3 ('display background operation as icon'), background operation is permitted and an icon that indicates that a print job is underway, for example, is displayed on the display unit 12. At level 4 ('display background operation only after error'), if an error occurs regarding a print job, that fact is displayed on the display unit 12. At level 5 ('display no background operation'), background operation is permitted, but no errors are displayed on the display unit 12 even if they occur.

'Security level' sets forth the control level regarding permission of external data transmission, transmission recipients and transmittable data. At level 1 ('network connection not permitted'), control is carried out such that network connection is not permitted and therefore data cannot be sent to external devices.

At level 2 ('transmission within intranet only permitted'), control is carried out such that transmission within the intranet only is enabled and therefore transmission of e-mail via the Internet, for example, is not permitted. At level 3 ('transmission to registered recipients only permitted'), control is carried out such that transmission via the Internet, for example, is possible but transmission only to recipients registered in the address book or the like is enabled.

At level 4 ('regular transmission permitted (no transmission of data with confidentiality attribute)'), transmission specifying a recipient in the normal fashion (i.e., e-mail address) is possible, but transmission of confidential documents is not permitted. At level 5 ('transmission of confidential documents permitted'), control is performed such that transmission of confidential documents is permitted as well.

As explained above, this embodiment has a construction in which one of multi-level control methods can be specified in accordance with the user's skill level. Naturally, the types of control and the definitions of control levels are not limited to the examples described above.

(4) Changing Control Method Settings

Changing the default control settings will now be explained below. The settings can be changed by the user via the screen shown in FIG. 6, for example, but in this embodiment, the control method setting unit 203 automatically changes the settings in the presence of an automatic setting changing condition.

In concept, the automatic setting changing condition of this embodiment can comprise the detection of a change in the user's skill level, for example. The change in the user's skill level can be detected when the user instructs that the control level for a certain type of control be changed, via the screen shown in FIG. 6, for example.

Automatic change of the settings can take one of the following forms, for example.

(1) Change the control level for all types of control
(2) Change the control level for the types of control closely related to the type of control for which the user instructed control method change The methods shown as examples below may be used as the method for automatic settings change:

(1) Change the control level for all types of control (for example, increase the control level by one for all types of control)

(2) Substantially change the control level for types of control having a close relationship to the type of control for which the user instructed control level change (by two levels, for example), but make a slight change (increase the control level by one) or no change for types of control that have only a tenuous relationship (3) Where the control level for a specific type of control is changed based on user input, substantially change the setting for other types of control (for example, where security level is changed, substantially change the setting for other types of control), and where the control level for a different type of control is changed, change the other control levels only slightly Naturally, these are only examples, and various other methods of settings change are possible. The relationships among types of control can be stored in a table, an example of which is shown in FIG. 16, such that the control method setting unit 203 refers to this table at the time of automatic settings change.

Figure 17:
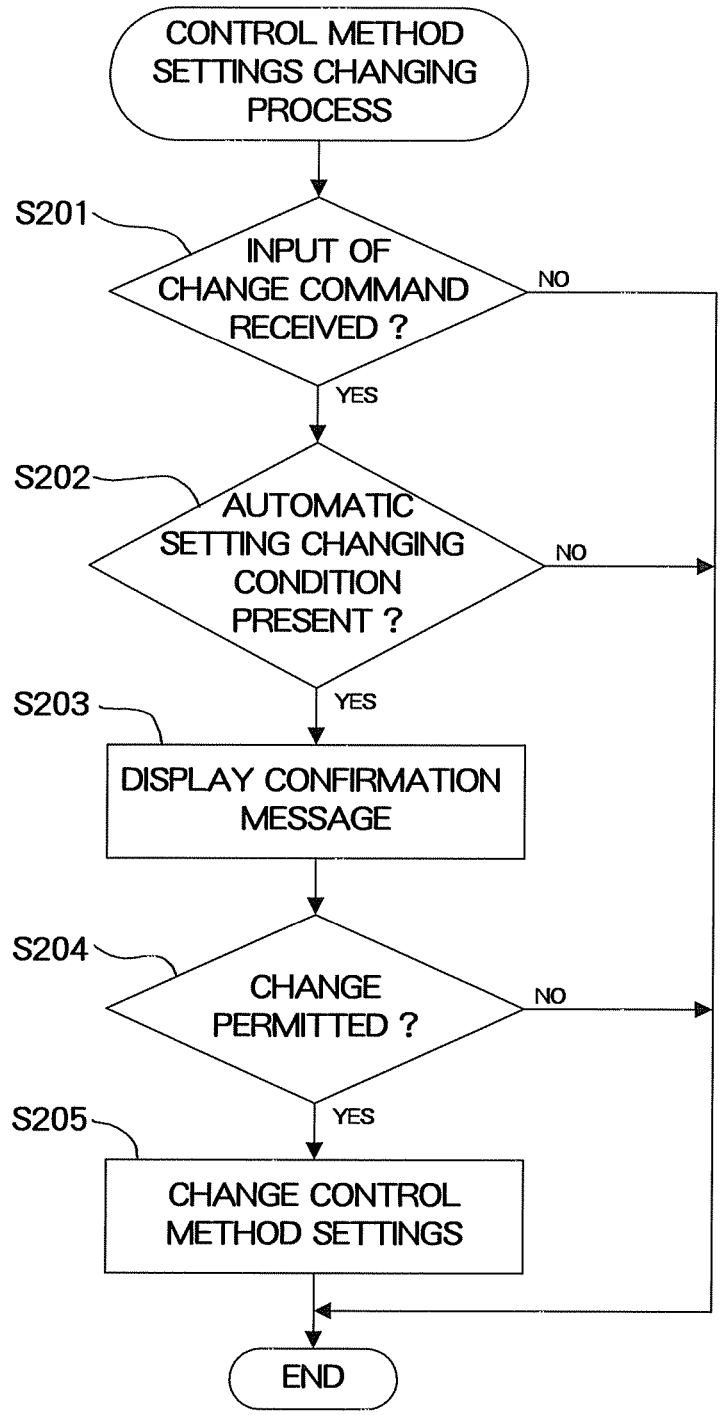
FIG. 17 is a flow chart to explain the sequence of operations of the control method changing process.

FIG. 17 is a flow chart to explain the sequence of specific operations of the control method changing process. In this embodiment, when the user inputs a control method change command (Yes in S201), it is determined whether or not the automatic setting changing condition is present (S202).

The automatic setting changing condition could be that the default control level for a specific type of control was changed by a prescribed number of levels or more via the input of a change command (for example, where level 2 is set for help display control by default, the change request input indicates a change of the control level by two or more levels, i.e., to level 4 or 5). Alternatively, it is also acceptable if the condition is that an input of a change command regarding the control level for the type of control specified for the purpose of default configuration was received. Other conditions may be used naturally; for example, the condition may be that the setting for a specific type of control (e.g., the security level) was changed regardless of the type of control specified for the purpose of default configuration or that the control level for a type of control was changed by a prescribed number of levels.

It may be possible to determine whether or not the automatic setting changing condition is present with reference to the history of the user's control method settings. FIG. 18 is a drawing to explain one example of the contents of the setting history storage unit 231. In this example, a control method setting history is retained for each user. [In the table,] it is shown as history that level 3 was specified for help display control by default and that control parameters were then changed such that the control level for error recovery was set to level 3. The control method setting unit 203 can perform processing to determine the presence of the automatic setting changing condition and to determine how the control methods should be changed with reference to this history information.

Figure 19:
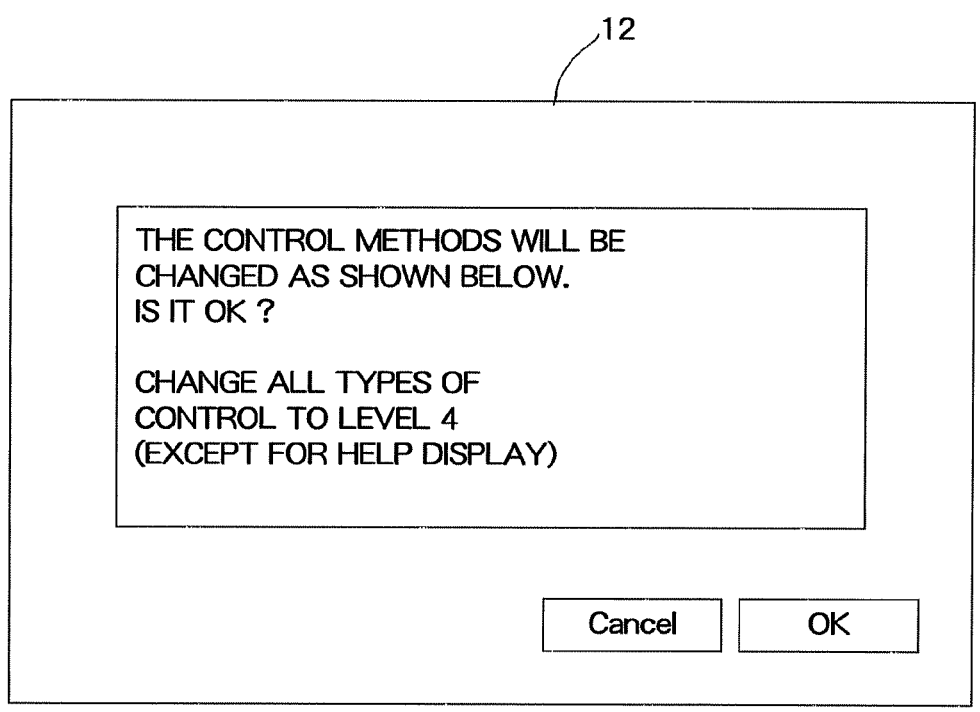
FIG. 19 is a drawing showing one example of the confirmation message display.

When the automatic setting changing condition is present (Yes in S202), a confirmation message is displayed to the user in this embodiment (S203). FIG. 19 is one example of the display of a confirmation message. When a user input indicating that the changes can be made is received (Yes in S204), the control method settings are changed (S205). When this is done, if it is configured such that no automatic change is made from the user-specified control level as to the types of control specified via user input (this information is retained as history as shown in FIG. 18), control method settings can be changed while reflecting the user's intentions more appropriately.

Where multiple control levels are made available, the number of such levels need not be the same for all types of control. In the example of FIG. 5, four control levels are available for workflow registration, which is different from the other types of control. It is also possible to provide more detailed types of control. For example, e-mail transmission and fax transmission may be dictated by different control methods with regard to 'security level'.

As explained above, using the image processing apparatus of this embodiment, if a user specifies and inputs one of supplied multiple control methods with regard to one of multiple types of control, control methods appropriate for that user are automatically set for the other types of control. As a result, because the user only needs to set the control method for the type of control (parameter) for which he can make an appropriate setting, the complexity of configuration is reduced while the user's intentions are reflected.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, in the embodiment described above, an MFP was used as an example of the image processing apparatus pertaining to the present invention. However, the image processing apparatus pertaining to the present invention is not limited to MFPs, and the present invention may be applied in general with regard to other image processing apparatuses including copying machines, printers, and facsimile machines.

What is claimed is:

1. An image processing apparatus comprising:
   a user identifier obtaining unit that obtains a user identifier;
   a controller for controlling a plurality of functions for the image processing apparatus, wherein each of the functions includes a plurality of options;
   a specification input receiving unit that receives input of one of the plurality of options for one of the plurality of functions;
   an option setting unit that, based on the specification input received by the specification input receiving unit, sets one of the plurality of options for each of the remaining plurality of functions for which an input was not received by the specification input receiving unit; and
   an option storage unit that stores the option received by the specification input receiving unit and the plurality of options set by the option setting unit and associates the stored options with the user that is specified by the user identifier obtained by the user identifier obtaining unit;
   wherein the controller executes control of the plurality of functions with the options stored in the option storage unit.

2. The image processing apparatus according to claim 1, wherein where the specification input receiving unit receives the input of a first function of the plurality of functions and a first option therefor, the option setting unit sets a second option for a second function, and where the specification input receiving unit receives the input of specification of the second option for the second function, the option setting unit sets an option for the first function that is different from the first option.

3. The image processing apparatus according to claim 1, further comprising a default settings storage unit that stores relationships between the one function and the option therefor that are input via the specification input receiving unit and the option for each of the remaining plurality of functions in the plurality of functions, wherein the option setting unit sets the option for the remaining plurality of functions with reference to the relationships stored in the default settings storage unit.

4. The image processing apparatus according to claim 1, further comprising an option settings changing unit that changes the option settings stored in the option storage unit with regard to at least one of the plurality of functions when an automatic setting changing condition is present.

5. The image processing apparatus according to claim 4, further comprising a change command receiving unit that receives the input of a change command instructing that the settings of option for each function be changed following the setting by the option setting unit, wherein the automatic setting changing condition is that the change command receiving unit has received an input of a change command regarding the option for the functions stored in the option storage unit.

6. The image processing apparatus according to claim 5, wherein the option settings changing unit changes the setting for at least one of the plurality of functions other than the function that was specified at the time of setting by the option setting unit.

7. The image processing apparatus according to claim 4, further comprising a change command receiving unit that receives the input of a change command instructing that the setting of option for each function be changed following the setting by the option setting unit, wherein the option settings changing unit does not change from the specified option the setting for the function the option for which was specified in the specification input or change command input.

8. The image processing apparatus according to claim 4, further comprising a confirmation input receiving unit that receives the input of the user confirmation as to whether or not changes are to be made before the option settings changing unit changes the options.

9. The image processing apparatus according to claim 4, further comprising a user resource storage unit that, when the option settings changing unit has changed the options, stores user resources generated by the user in the process including execution of control of each function at the various options.

10. The image processing apparatus according to claim 4, wherein multiple levels of function for which different processing is executed as a result of control of the function are supplied in advance as the plurality of options.

11. The image processing apparatus according to claim 10, wherein the multiple levels represent options created in accordance with the user's skill level, and the option settings changing unit changes the options when the skill level of the user specified by the user identifier is determined to have changed.

12. The image processing apparatus according to claim 10, further comprising a change command receiving unit that receives the input of a change command instructing that the setting of option for each function be changed following the setting by the option setting unit, wherein the automatic setting changing condition is that the option for one function stored in the option storage unit is changed by a prescribed number of levels via the input of a change command received by the change command receiving unit.

13. The image processing apparatus according to claim 1, wherein the plurality of functions include at least one of the following:
   (1) function regarding the help display method
   (2) function regarding the resolution of an error
   (3) function regarding workflow registration
   (4) function regarding the display of an operation menu on the display unit
   (5) function regarding execution and display of jobs that operate in the background
   (6) function regarding transmission of data to external devices.

14. The image processing apparatus according to claim 1, further comprising a display screen, wherein the options include control of function regarding the contents of display on the display screen.

15. The image processing apparatus according to claim 1, wherein the plurality of options for each function are based on a skill level of a user.

16. The image processing apparatus according to claim 1, wherein the option setting unit, based on the specification input received by the specification input receiving unit, performs default configuration that sets one of the plurality of options for each of the remaining plurality of functions for which an input was not received by the specification input receiving unit, wherein each of the options set by the option setting unit is preselected based on the input option received by the specification input receiving unit.

17. The image processing apparatus according to claim 1, wherein the option set by the option setting unit for at least one of the remaining plurality of functions for which an input was not received by the specification input receiving unit is different from the option for the one of the plurality of functions received by the specification input receiving unit.

18. A control method executed by an image processing apparatus comprising the steps of:

obtaining a user identifier;
receiving specification input of one of a plurality of options for one of a plurality of functions by a specification input receiving unit, wherein each of the functions includes a plurality of options;
setting by an option setting unit one of the plurality of options for each of the remaining plurality of functions for which an input was not received by the specification input receiving unit, based on the received specification input;
storing the option for the function received by the specification input receiving unit as well as the options for the remaining plurality of functions set by option setting unit and associating them with the user that is specified by the obtained user identifier; and
executing control of the plurality of functions in accordance with the stored options.

19. The option according to claim 18, wherein the plurality of options for each function are based on a skill level of a user.

20. A non-transitory computer-readable medium encoded with a software program which causes a computer included in an image processing apparatus to execute a processing comprising processes of:

obtaining a user identifier;
receiving specification input of one of a plurality of options for one of a plurality of functions by a specification input receiving unit, wherein each of the functions includes a plurality of options;
setting by an option setting unit one of the plurality of options for each of the remaining plurality of functions for which an input was not received by the specification input receiving unit, based on the received specification input;
storing the option for the function received by the specification input receiving unit as well as the options for the remaining plurality of functions set by option setting unit and associating them with the user that is specified by the obtained user identifier; and
executing control of the plurality of functions in accordance with the stored options.

21. The non-transitory computer-readable medium according to claim 20, wherein the plurality of options for each function are based on a skill level of a user.

* * * * *